Patented May 18, 1943

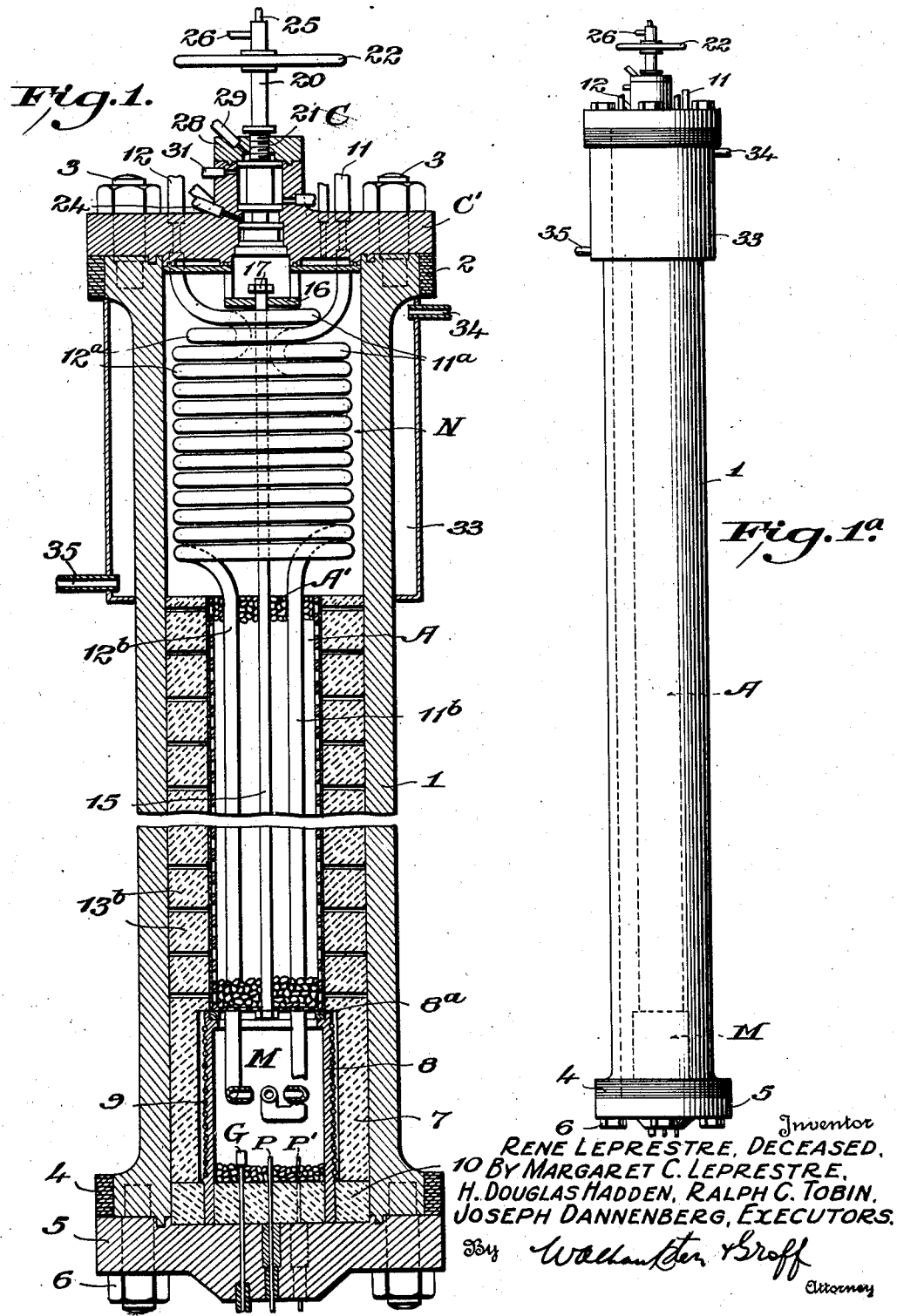

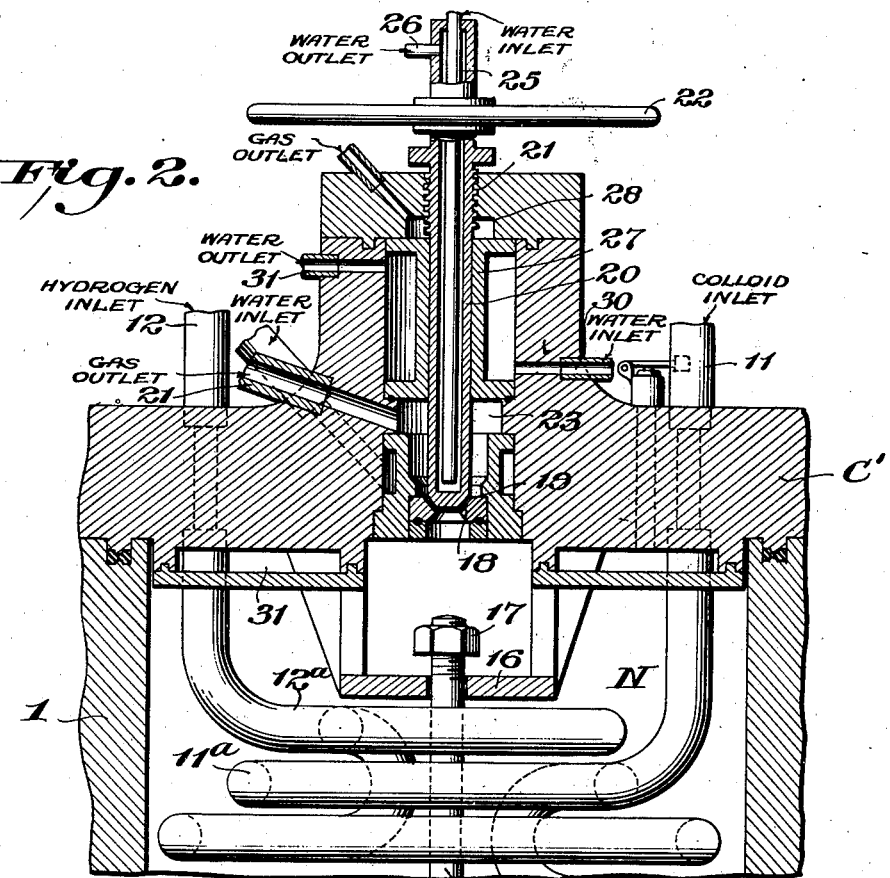

2,319,508

UNITED STATES PATENT OFFICE 2,319,508

APPARATUS FOR PRODUCING HYDROGENATED HYDROCARBON PRODUCTS

Rene Leprestre, deceased, late of New York, N. Y., by Margaret Cornell Leprestre, Reading, Pa., H. Douglas Hadden, Westport, Conn., Ralph C. Tobin and Joseph Dannenberg, New York, N. Y., executors Original application May 10, 1938, Serial No. 207,095. Divided and this application December 26, 1941, Serial No. 424,556

5 Claims. (Cl. 196—53)

This invention relates to an apparatus for producing hydrogenated hydrocarbon products, for example, motor fuel of high octane value and this application is a division of application, Serial No. 207,095, filed May 10, 1938, now Patent No. 2,271,017, dated January 27, 1942, on a method of making such products.

While the apparatus of the present invention is susceptible of use for other processes in the manufacture of hydrogenated hydrocarbon products, it is specially designed to provide a novel means for controlling the involved process in such a manner as to obtain hydrocarbons of different hydrogen content, as well as to provide novel means for pre-heating the hydrocarbon mixture and the hydrogen or hydrogen carrier before they are injected into the retort of the reaction chamber.

Also, a further object of the invention is to provide simple and expeditious means for renewing the catalytic element when its efficiency has been reduced by continued operation, and other objects of the invention will more readily appear, as the nature of the same is better understood, the same consisting in the novel apparatus hereinafter more fully set forth and claimed.

A preferred form of the apparatus is shown in the accompanying drawings, in which:

Figure 1 is a vertical sectional view of the retort.

Figure 1ᵃ is a diagrammatic side elevation of the complete retort.

Figure 2 is an enlarged detail sectional view of the upper portion of the retort.

Figure 3 is an enlarged vertical sectional view of the bottom of the retort.

Figure 4 is a diagrammatic view of the preferred arrangement of nozzles for the hydrogen and the colloidal solution.

In carrying out the invention, the first step is to prepare an aqueous mixture of the hydrocarbon base material to be hydrogenated, and to incorporate in the mixture a small percentage of a suitable emulsion stabilizer, such, for instance, as alcohol.

The hydrocarbon, water and alcohol are emulsified in suitable colloid mills to reduce the entire mass completely to its colloidal state. This colloidal emulsion is then heated under pressure to approximately 1000° to 1200° F. and pumped under high pressure, according to the material to be treated, into the reaction chamber through opposed nozzles so directed that the jets impinge upon each other. The chamber pressure will be that required for the conversion of the particular mixture into the desired hydrocarbon fraction and the pump pressure must be sufficiently higher than this to insure sufficient jet velocity to break the mixture up into fine spray. Water gas or hydrogen is also injected into the chambers through another pair of opposed nozzles set in the same plane as the mixture nozzles and so set that the jets impinge both on each other and on the points of impact of the mixture jets. The pressure of the hydrogen is determined by the same considerations as those determining the pressure of the mixture. Both the mixture and the hydrogen reach the nozzles through pipe coils contained in the upper end of the retort through which means the entering mixtures are preheated to any desired degree, according to the material to be treated, less than the retort temperatures, and simultaneously the exit gases from the retort are cooled.

The mixture of spray and gas from the nozzles passes upwardly through the retort and is thus carried through the catalytic material and, due to the combinations of pressure, temperature and action of the catalyst, the chemical reactions are completed to produce hydrocarbon fractions of the desired composition.

Preparatory to starting the retort, it is brought up to the desired temperature by the use of the heating coil in the lower section of the retort. After the reactions have started, any added heat required by the combination of the chemical reactions is supplied through the heating coil.

Referring particularly to the exemplification of the invention shown in the drawings it will be observed that the retort includes a suitable column or casing 1 provided at its upper end with the flange portion 2 for facilitating the securing of a cap or cover structure C thereto by the use of suitable bolts 3, while the bottom of the column is provided with the flange 4 which provides adequate means for anchoring a base plate 5 thereto by the bolts 6 or equivalent fastenings.

The lower portion of the casing 1 is lined with suitable refractory material 7 surrounding an electrical heating element in the form of an annular member 8 which provides a mixing or impinging chamber M as will later appear. The heating element 8 has the electrical wires 9 coiled about its outer face so that the inner face thereof presents a smooth unbroken surface. The electrical connections for the heating wires 9 may be made through the conduit 9ᵃ (Fig. 3) in the base plate 5. The lower portion of the heating element 8 is embedded in the horizontal layer of refractory material 10 covering the inner face of the base 5, and, at this point, it may be noted that the said base 5 is suitably constructed to provide for the insertion of one or more pyrometers P and P' and a pressure gauge G.

The cap structure C carries therewith suitable pipes 12 and 11 for supplying the hydrogen and the mixture or colloid to the retort, and also carries the catalytic unit A so that when the bolts 3 have been disconnected from the flange 2, the entire cap structure C and its associated parts may be lifted bodily out of the retort by the use of a crane or other suitable lifting apparatus. In that connection, it will, of course, be understood that the pipes 11 and 12 which respectively supply the mixture or colloid and the hydrogen are provided with suitable joints which may be disconnected when it is desired to lift the cover C from the retort of the casing 1.

The catalyst A' (for example), iron oxide, is contained in a basket 13 having a foraminous bottom wall 13$^a$ engaged and supported by the head 14 of a rod 15 when the cover structure C is removed from the casing. In that connection, however, it will be observed that the said bottom wall 13$^a$ of the basket may rest upon the annular abutment 8$^a$ of the heating element when the basket is in use as shown in Figure 1. That is to say, the upper end of the rod 15 extends through a strap or bracket 16 carried by the cover structure and the nut 17 on the rod is preferably so positioned that the cover will have a certain amount of play relative to the rod, thus insuring the proper degree of tolerance to permit the basket to rest on the annular abutment 8$^a$, of the heating element, and at the same time permit the cover structure including the plate C', to flushly seat on the flange 2. The foraminous basket which holds the catalyzer A' is surrounded by refractory blocks 13$^b$ which may have lateral expansion passages therebetween.

Referring further to the cap or cover structure C, it is pointed out that the mixture pipe 11 carried by the cover is formed internally of the retort, that is, within what may be termed a gas collecting chamber, or a preheating chamber N, with a mixture preheating coil 11$^a$, and likewise, the portion of the hydrogen pipe 12 at the underside of the cover C is formed into a hydrogen preheating coil 12$^a$ so that both the mixture pipe and the hydrogen pipe are coiled within the upper portion of the retort above the catalyzer unit A. The lower end 11$^b$ of the mixture pipe extends through the catalyzing material A' in the basket 13 and projects into the mixing chamber M where it is provided with the horizontal branch pipe 11$^c$ which is preferably of arcuate formation (Fig. 4) and provided with diametrically disposed nozzle portions 11$^d$ forming jets disposed in opposed relation toward the axis of the mixing chamber M so that high pressure streams of mixture issuing from opposite jets impinge upon each other, in the mixing chamber, while the device is in operation.

Similarly, the lower portion of the hydrogen pipe below the coil 12$^a$ is provided with an extension 12$^b$ which passes through the catalyzing material A' in the basket 13 and thence through the bottom of the basket into the mixing chamber where it is also provided with an arcuate branch pipe 12$^c$ formed with diametrically disposed hydrogen discharging nozzles 12$^d$. These nozzles are preferably arranged in the same plane as the nozzles 11$^d$ and are located at an angle of 90° to said mixture discharging nozzles. The effect of arranging the nozzles 11$^d$ and 12$^d$ in the manner shown in Figure 4, for example, is to provide oppositely discharging jets of mixture and hydrogen which impinge on each other at the axis of the mixing chamber at the same time, and because of the high pressure at which the mixture and hydrogen are discharged against each other they are thoroughly mixed or broken up at their point of contact. This mixture forces itself through the catalyzing chamber upwardly into the chamber N at the upper end of the retort, said chamber containing the preheating coils 11$^a$ and 12$^a$, respectively for the colloid mixture and the hydrogen.

When the gases reach the top of the chamber N they have given up considerable heat to the coils 11$^a$ and 12$^a$, and therefore they are considerably lowered in temperature as compared with the heat in the mixing chamber.

From the chamber N the products pass through a valve orifice whose area may be accurately controlled and predetermined to permit obtaining different qualities of hydrocarbon distillate. That is to say, if it is desired to produce, for example, high octane gasoline, the valve orifice is set to produce a very small or limited clearance which has the effect of keeping all of the mixture in the retort longer, thus subjecting them to prolonged contact with the catalyzer to insure more thorough union of the hydrogen and hydrocarbon vapors. On the other hand, if it is intended to produce low octane hydrocarbon products the valve orifice may be opened wider or, in other words, a greater outlet area or clearance may be provided which will allow the products to escape quicker from the retort and hence with a shorter period of contact with the catalyzer.

Referring to Figure 2 it will be apparent that the gases in the chamber N are permitted to pass therefrom to the condenser (not shown) through the valve orifice 18 which operates in conjunction with a valve head 19 formed at one end of hollow stem 20. This stem has external threads 21 so that when it is turned or rotated by the hand wheel 22, the position of the valve head 19 may be varied relative to the seat 18. As the products pass between the valve seat 18 and the head 19 it enters a chamber 23 in the cover, the said chamber being connected to an outlet tube 24 leading to a condenser. The hollow stem 20 of the valve assembly is provided with a water inlet pipe 25 whose discharge end extends in close proximity to the valve head 19, and a water take-off connection 26 is provided for the hollow stem 20 above the hand wheel. Also, it will be seen that a suitable packing 27 is provided about the hollow valve stem 20 above the chamber 23 and below the screw threads 21. However, to fully utilize any gas that may escape past the packing 27, there is provided above said packing a trap chamber 28 which in turn is provided with a take-off 29 leading to the condenser. The packing 27 is preferably in the form of a spool thus enabling a water jacket to be formed about the medial portion of the valve stem 20, the said jacket being provided with a water inlet connection 30 and a water outlet 31. In addition, the face of the cover C exposed to the gases within the chamber N may be provided with a water jacket 32, suitable inlet and outlet connections being provided for the purpose.

The upper outer portion of the column 1 in the zone of the chamber N may also be provided with a water jacket 33, the said jacket being provided with a water inlet connection 34 and an outlet connection 35.

Referring to the general operation of the apparatus and the several stages of the process performed therein, it is pointed out that the hydrocarbon base material, in finely divided or colloidal form, is pumped or introduced into the retort through the supply connection 11. The hydrocarbon mixture then proceeds through the preheating coil 11$^a$, and thus becomes heated as it flows downwardly toward the mixing chamber M through the pipe extension 11$^b$. When the preheated hydrocarbon mixture reaches the branch pipe 11$^c$, it is forced through opposed branch nozzles 11$^d$ thus forming opposing mixture jets which impinge upon each other with great force at approximately the axis of the mixing chamber M.

Simultaneously, with the introduction of the hydrocarbon mixture into the retort, hydrogen gas enters the pipe 12 and then passes through the preheating coil 12$^a$ and pipe section 12$^b$ to the branch connection 12$^c$ whereupon the hydrogen is discharged through the opposed nozzles 12$^d$, in jet form, not only to cause the hydrogen jets to impinge upon themselves but to also impinge upon the hydrocarbon mixture jets discharging from the nozzles 11$^d$.

According to one example, the hydrocarbon mixture and hydrogen may both be forced into the nozzles at approximately 12,000 to 14,000 pounds pressure.

The chamber M, as previously indicated is preheated before the hydrogen and hydrocarbon mixture are introduced and is subsequently maintained at the required temperature, for example, approximately 1000° F., in the example now given, by the electric heating element 9. Thus, when the hydrogen and the hydrocarbon mixture are pumped into the mixing chamber at a uniform pressure as above indicated the resultant mixture is forced upwardly through the bed of catalyst in the basket 13.

After the mixture is transformed into new products by the catalyst it passes through the chamber N, which, as previously explained, is entirely closed except for the valve 18—19 which is definitely and accurately set at a predetermined clearance. If the valve is so adjusted as to hold back the gases in the chamber N, or in other words, if the valve is set with only a comparatively small opening, it will be apparent that the gases are held for a prolonged period of contact with the catalyst to produce a motor fuel having a higher content of hydrogen and a high octane value, i. e., viz., 95 to 98 octane number.

Taking one example, as an illustration, if it is desired to produce a lower grade gasoline (68 to 70 octane) it is necessary to open the valve wider, and also change the pressure and the quantity of hydrogen. In this example, the pressure of hydrogen and hydrocarbon mixture may be lowered to from 5000 to 8000 pounds, and the temperature maintained in the mixing chamber at approximately 1000° F. While the process has been operated at temperatures from approximately 900° F. to 1150° F. it is obvious to those skilled in the art that varying both temperature and, or, pressure will result in the formation of different hydrocarbons. It is likewise obvious that the high limits are governed by the construction of the reaction chamber.

The mixing and impinging chamber M may be accurately checked as to temperature through the medium of pyrometers P and P' located substantially at the axis of the mixing chamber and near the wall thereof so that the temperature can be maintained at the desired degree under all conditions of use. Moreover, through the medium of the pressure gage G the pressure in the mixing chamber may be accurately checked so that the operating pressure at all times may be controlled through the manipulation of the valve 18—19. As previously indicated, the pressure of both hydrogen and hydrocarbon mixture is always uniform in any given example, according to the product desired; and a suitable automatic relief valve of any approved type may be placed in any convenient location to provide for relief of the retort from any excessive or abnormal pressure rise that may occur therein.

The products of the reactions occurring in the catalyst chamber may be released to atmospheric pressure by the control valve 18—19 and the vapor mixture thus produced cooled and condensed by conventional means and any residual gases subsequently separated. It will be understood, however, that cooling and condensation of the products may be carried out under pressure, if desired; such pressures would ordinarily be below the operating pressures of the catalyst chamber. Condensation of the products under moderate pressures has the advantage of retaining very volatile hydrocarbons in the condensate. However, the means employed for condensation of motor fuels and the like are well understood in the art and are not a part of this invention.

From the foregoing it will be apparent that the distinctive features of the present invention reside in the provision of a heated mixing chamber into which hydrocarbon mixture and hydrogen may be injected and mixed in the presence of controlled heat, pressure, and water gas, thereby to produce a new mixture. This mixture forces its way through the catalyst containing basket 13 which brings about the complete union of the constituents and forms new reaction products.

Inasmuch as the colloid and water gas supply pipes, and their coils, are carried by the cover, and the catalyzer basket 13 is also connected to the cover, it will be apparent that the entire interior assembly of the retort may be removed when desired, or when the catalyzer requires removal.

From the foregoing it is thought that the construction, operation and many advantages of the herein described apparatus will be understood without further description, and also that changes in the form and minor details of construction may be resorted to without departing from the spirit of the invention as covered by the appended claims.

It is claimed:

1. An apparatus for hydrogenating hydrocarbons comprising a retort column having a mixing chamber at its lower end and a gas collecting chamber at its upper end, valve means for controlling the flow of gases from said collecting chamber, heating means for the mixing chamber, a foraminous basket containing a catalyzer and arranged between the mixing chamber and the collecting chamber, and means for introducing hydrogen and an aqueous colloidal mixture of a hydrocarbon into the mixing chamber, said means comprising a plurality of hydrogen jets and a plurality of solution jets arranged substantially in the same horizontal plane and disposed at an angular relation of 90°.

2. An apparatus for increasing the hydrogen content of hydrocarbons comprising a retort column, a cover and a base removably fitted to said column, an annular heating element arranged at the bottom of the column and providing a mixing chamber, hydrogen and colloidal solution supplying pipes each including coil portions carried by the cover and having extensions provided with nozzles positioned in said mixing chamber, and a foraminous basket also carried by the cover for holding catalyzing material, said foraminous basket having a slidable connection with the cover whereby the latter may be fitted on the top of the column when the basket is applied to the top of the mixing chamber.

3. An apparatus for increasing the hydrogen content of hydrocarbons comprising a retort column having a cover and a base removably fitted thereto, an annular member surrounded by a heating coil supported by the base and forming a mixing chamber, a pyrometer and a pressure gage disposed in said mixing chamber, a catalyzer unit above the said annular member, hydrogen gas supply means and colloidal solution supply means both carried by the cover and each having a coiled portion disposed within the column above said mixing chamber and also having nozzles located in said mixing chamber, and valve means carried by the cover for controlling the passage of gas from said retort.

4. An apparatus for increasing the hydrogen content of hydrocarbon products comprising a retort column provided with a gas collecting chamber within its upper end, valve means for controlling the outlet of gases from said collecting chamber, an annular heating element arranged within the lower portion of the column and providing a mixing chamber, a catalyzer unit arranged within the retort column between the upper collecting chamber and the lower mixing chamber and in communication with both of said chambers, and hydrogen-carrier and colloidal solution supply pipes each extending through the upper collecting chamber and provided with discharge nozzles disposed within said mixing chamber.

5. An apparatus for increasing the hydrogen content of hydrocarbon products comprising a retort column provided with a gas collecting chamber within its upper end, valve means for controlling the outlet of gases from said collecting chamber, an annular heating element arranged within the bottom portion of the column and providing a mixing chamber, a catalyzer unit arranged within the retort column between the upper collecting chamber and the lower mixing chamber and in communication with both of said chambers, and hydrogen-carrier and colloidal solution supply pipes each having pre-heating coils within said collecting chambers and each provided with discharge nozzles disposed within said mixing chamber.

MARGARET CORNELL LEPRESTRE.
H. DOUGLAS HADDEN.
RALPH C. TOBIN.
JOSEPH DANNENBERG.
*Executors of the Estate of Rene Leprestre, Deceased.*